US010041403B2

(12) United States Patent
Golad

(10) Patent No.: US 10,041,403 B2
(45) Date of Patent: Aug. 7, 2018

(54) GENERATOR ASSEMBLY AND MODULAR POWER SUPPLY SYSTEM

(71) Applicant: Amir Golad, London (GB)

(72) Inventor: Amir Golad, London (GB)

(*) Notice: Subject to any disclaimer, the term of this patent is extended or adjusted under 35 U.S.C. 154(b) by 388 days.

(21) Appl. No.: 14/406,382

(22) PCT Filed: Jun. 10, 2013

(86) PCT No.: PCT/GB2013/000256
§ 371 (c)(1),
(2) Date: Dec. 8, 2014

(87) PCT Pub. No.: WO2013/182836
PCT Pub. Date: Dec. 12, 2013

(65) Prior Publication Data
US 2015/0330294 A1 Nov. 19, 2015

(30) Foreign Application Priority Data

Jun. 8, 2012 (GB) .................................. 1210294.3

(51) Int. Cl.
*F02B 63/04* (2006.01)
*F02B 77/13* (2006.01)
(Continued)

(52) U.S. Cl.
CPC .............. *F02B 63/044* (2013.01); *A45F 3/06* (2013.01); *A45F 3/10* (2013.01); *F02B 63/048* (2013.01);
(Continued)

(58) Field of Classification Search
CPC ...... F02B 63/04; F02B 63/044; F02B 63/047; F02B 77/13; F02B 77/11; F02B 63/048; H02K 7/1815; A45F 3/06; A45F 3/10
See application file for complete search history.

(56) References Cited

U.S. PATENT DOCUMENTS 4,677,940 A * 7/1987 Bracht ...................... F01P 1/00
123/2
4,779,905 A * 10/1988 Ito ........................... F02B 63/04
123/2
(Continued)

FOREIGN PATENT DOCUMENTS

CA   1 209 884        8/1986
EP   1 069 295 A1     1/2001
(Continued)

OTHER PUBLICATIONS

Office Action dated Feb. 11, 2016 for Application No. GB 1310253.8.
(Continued)

*Primary Examiner* — Sizo Vilakazi
(74) *Attorney, Agent, or Firm* — Ladas & Parry LLP

(57) ABSTRACT

A generator assembly suitable for being carried on the back of a human comprising an internal combustion engine an alternator and a shaft driven by said engine and driving said alternator wherein when said generator assembly is being carried on the back of human said shaft is substantially parallel to a longitudinal axis of said human. This enhances the maneuverability of the assembly. Preferably the assembly comprises a generator module having an engine and an alternator coupled directly by a common shaft, the generator being attached to a frame of the assembly at only two longitudinally spaced-apart positions.

25 Claims, 13 Drawing Sheets

(51) Int. Cl.
 *F02B 77/11* (2006.01)
 *H02K 7/18* (2006.01)
 *A45F 3/06* (2006.01)
 *A45F 3/10* (2006.01)

(52) U.S. Cl.
 CPC ............. *F02B 77/11* (2013.01); *F02B 77/13* (2013.01); *H02K 7/1815* (2013.01); *F02B 63/047* (2013.01); *F02B 2063/045* (2013.01); *F02B 2063/046* (2013.01)

(56) References Cited

U.S. PATENT DOCUMENTS

| | | | | |
|---|---|---|---|---|
| 4,907,546 | A | * | 3/1990 | Ishii ........................... F01P 5/02 123/2 |
| 5,555,853 | A | * | 9/1996 | Bowen ................... F02B 63/04 123/2 |
| 2007/0227470 | A1 | * | 10/2007 | Cole ..................... H02K 1/2786 123/3 |
| 2009/0015022 | A1 | * | 1/2009 | Rome ....................... A45F 3/08 290/1 A |
| 2011/0056443 | A1 | * | 3/2011 | Schliemann ............. A01G 1/12 123/2 |

FOREIGN PATENT DOCUMENTS

| | | |
|---|---|---|
| EP | 2 314 843 A1 | 4/2011 |
| GB | 2 196 486 A | 4/1988 |
| GB | 2 213 202 A | 8/1989 |
| JP | 59-39933 A | 3/1984 |
| JP | 2011-244724 A | 12/2011 |
| WO | 95/26464 A1 | 10/1995 |

OTHER PUBLICATIONS

Espacenet English abstract of JP 59-39933 A.
English Abstract of JP 2011-244724 A.

* cited by examiner

GENERATOR ASSEMBLY AND MODULAR POWER SUPPLY SYSTEM

RELATED APPLICATION

This application is a national phase entry under 35 USC 371 of International Patent Application No PCT/GB2013/000256 filed on 10 Jun. 2013, which was published in the English language on 12 Dec. 2013 with International Publication Number WO 2013/182836 A1, which claims priority from GB Patent Application No. 1210294.3 filed on 8 Jun. 2012, the disclosures of which are incorporated in their entirety by reference herein.

The present invention relates to a generator assembly suitable for being carried on the back of a human, particularly to a generator assembly capable of being carried as a pack on the back of said human. The invention also relates to a modular power supply system.

U.S. Pat. No. 5,555,853 discloses a back-pack generator assembly comprising an engine, an alternator and a shaft driven by said engine and driving said alternator. When the back-pack generator assembly of U.S. Pat. No. 5,555,853 is being carried on the back of a human said shaft is substantially orthogonal to a longitudinal axis of said human.

In one aspect the subject invention provides a back-pack generator assembly suitable for being carried on the back of a human, the generator assembly comprising a generator set supported by a pair of laterally spaced apart shoulder straps, the shoulder straps having a longitudinal axis, the generator set comprising an engine, an alternator longitudinally spaced apart from the engine and a shaft assembly for driving said alternator, wherein one or more shafts of said shaft assembly are substantially parallel to said longitudinal axis.

In preferred embodiments, when the generator assembly is being carried on the back of a user, the generator is positioned substantially within a periphery of the body of said user so that the user can carry the generator assembly without banging the generator assembly on external structures, for example a door frame.

Preferably said generator assembly further comprises an elongate frame for being strapped to the back of said human with said straps, said frame having a longitudinal axis wherein one or more shafts of said shaft assembly are substantially parallel to said longitudinal axis of said frame. The frame is suitably provided with padded shoulder straps and belt straps so that the generator assembly can easily and comfortably be carried on a user's back. The frame also serves to support the generator assembly during operation of the generator assembly when the frame is dismounted from the user.

Preferably said generator set is a module removably attached to said frame at only two longitudinally spaced-apart positions, said shaft assembly comprising a common shaft coupling said engine and alternator at an intermediate longitudinal position.

This preferred feature has the advantage that the generator set module can easily be dismounted from the frame and exchanged with a different generator set module or a battery pack, for example. The shaft provides the necessary rigidity of connection between the engine and alternator.

Preferably said common shaft couples said engine to said alternator directly without a gearbox. This enhances rigidity and saves weight.

In one embodiment the generator set is secured to the frame by a rectangular array of four screwed fasteners, two at each of said longitudinally spaced-apart positions.

In one embodiment said module comprises a mounting plate which carries said generator set and is removably attached to said frame at said two longitudinally spaced-apart positions.

Preferably said frame has an array of deployable legs mounted thereon for supporting said generator set on the ground.

In one embodiment the frame of the generator assembly has four corner portions each said corner portion having a deployable/retractable leg mounted thereon said leg being capable of being deployed for supporting said generator assembly on the ground. In other embodiments, differently shaped frames may be employed, eg without corner portions or having three or more than four corner portions.

In use of such embodiments, a user can easily unload the generator assembly from his back and quickly position it on the ground by deploying said legs. The generator assembly is then in a stable position on the ground and can quickly and easily be started up to provide an electricity supply.

Preferably said deployable legs are mounted at corner portions of said frame, are substantially orthogonal to a common plane of said corner portions and are slidable from a retracted configuration in which the array of legs surrounds said generator set and projects away from a rear side of the frame on which said generator set is mounted to a deployed configuration in which the array of legs projects towards the ground from a front side of the frame.

This preferred feature has the advantage that the legs protect the generator set while the generator assembly is being carried.

In a preferred embodiment said frame of said generator assembly has a first end portion of said frame located at one end of a longitudinal axis of said frame and a second end portion of said frame located at an opposite end of said longitudinal axis said frame further comprising one or more wheels mounted on said first end portion and a handle mounted on said second end portion so that said generator assembly can be pulled along the ground on said wheels. An advantage of this preferred feature of the generator assembly is that the generator assembly can be easily moved about on its wheels by a user for positioning said generator assembly in a desired position.

Further preferred features are defined in the dependent claims.

In another aspect the invention provides a modular back-pack power supply system comprising an elongate frame having a longitudinal axis, a pair of laterally spaced apart shoulder straps, the shoulder straps having a longitudinal axis which is substantially parallel with the longitudinal axis of the elongate frame, and an elongate generator set module comprising an engine, an alternator longitudinally spaced apart from the engine and a shaft assembly for driving said alternator, wherein said elongate generator set module is mountable on said frame with one or more shafts of said shaft assembly substantially parallel to said longitudinal axes to form a back-pack generator assembly suitable for being carried on the back of a human.

This modular system can be assembled to provide a generator assembly in accordance with the first aspect of the invention, and, being modular, facilitates replacement or substitution of the generator set module.

Thus in a preferred embodiment, the modular back-pack power supply system further comprises a battery module which is removably attachable to said frame in place of said generator set module at mounting positions which correspond to mounting positions used for the generator set module.

In a further preferred embodiment the modular back-pack power supply system further comprises one or more further generator set modules having different engines.

Preferably said generator set module is removably attachable to said frame at only two longitudinally spaced-apart positions, said shaft assembly comprising a common shaft coupling said engine and alternator at an intermediate longitudinal position. The common shaft coupling provides the necessary rigidity and reduces the required number of attachment positions on the frame, enabling rapid substitution or replacement of the generator set module.

In one embodiment the generator set module can be bolted to said frame by a rectangular array of four screwed fasteners, two at each of said longitudinally spaced-apart positions.

In one embodiment the frame further comprises one or more substantially U-shaped elongated members for supporting a flexible outer cover of said generator assembly over said engine said alternator and said shaft assembly, each end of each of said one or more substantially U-shaped elongated members being located on a portion of said back of said frame near opposite longer sides thereof.

Further preferred features are defined in the dependent claims.

Preferred embodiments of the invention are now described by way of example only with reference to FIGS. 1 to 11 of the accompanying drawings wherein.

Throughout the drawings, corresponding parts are indicated by common reference numerals.

Figure 1:
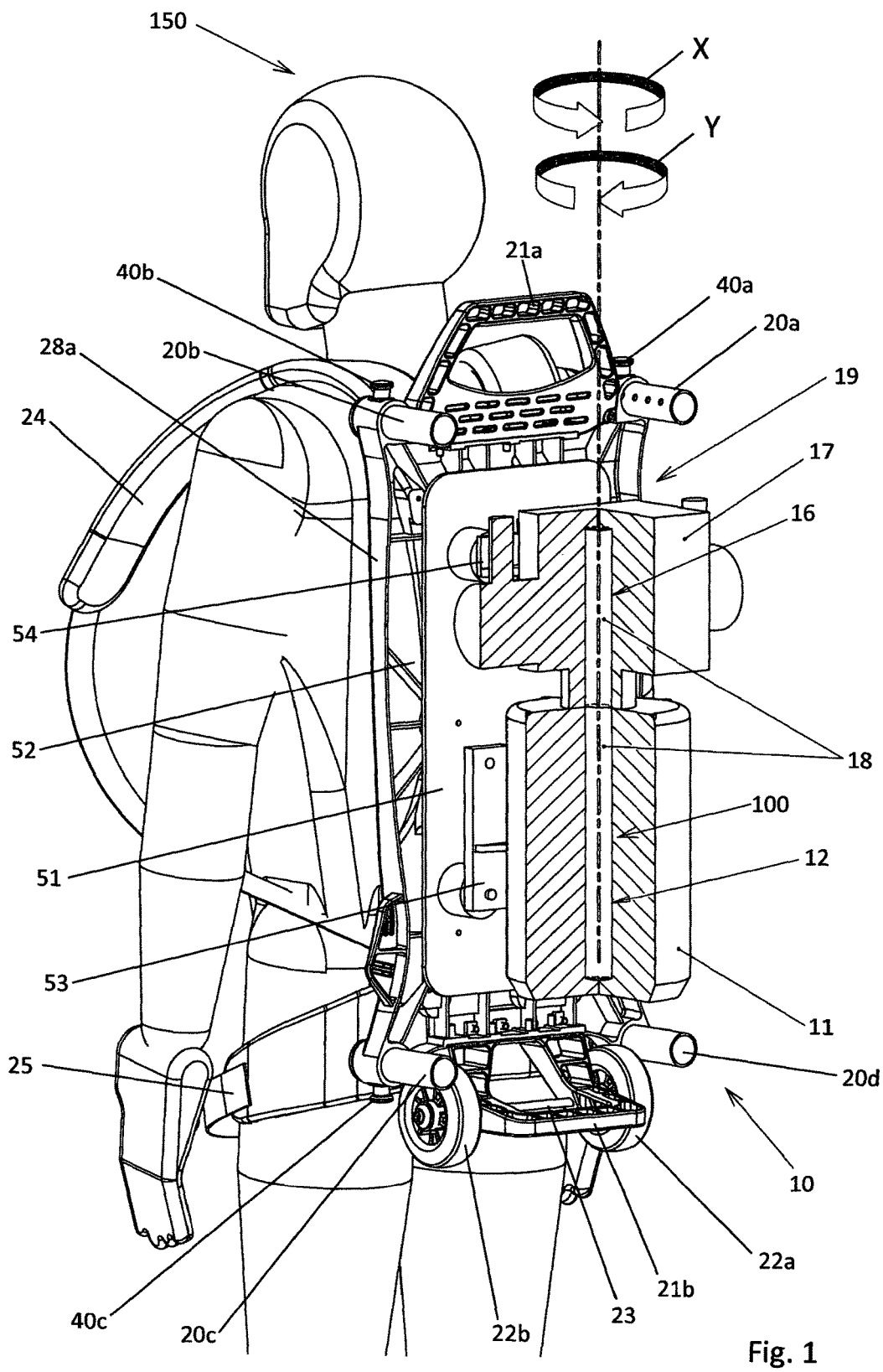
FIG. 1 is a partially cut away view of a first embodiment of the generator assembly of the subject invention without gears.
Figure 1A:
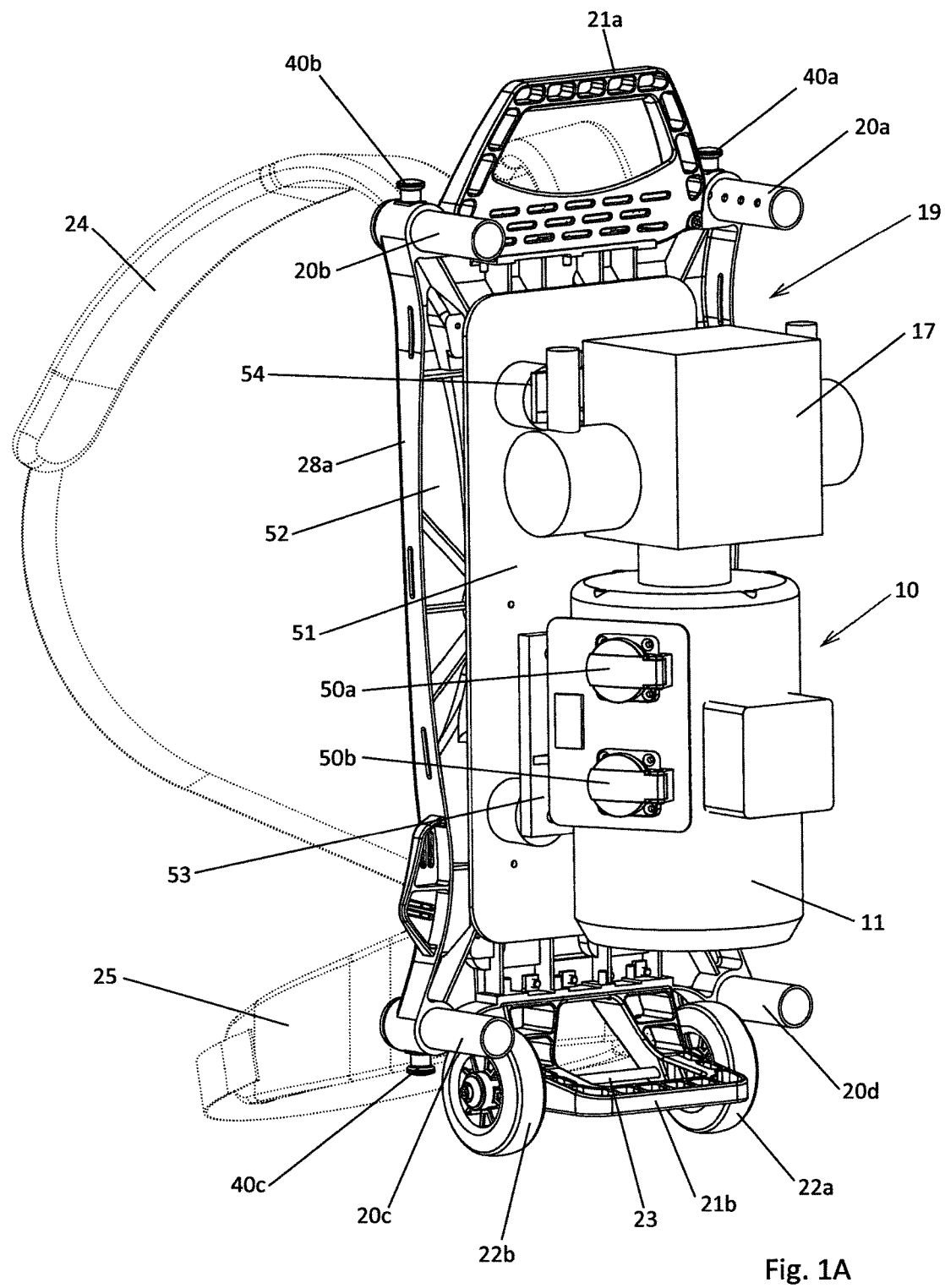
FIG. 1A shows the generator assembly of FIG. 1 in perspective view showing an outside view of the engine/alternator etc, dismounted from the back of a user.
Figure 2:
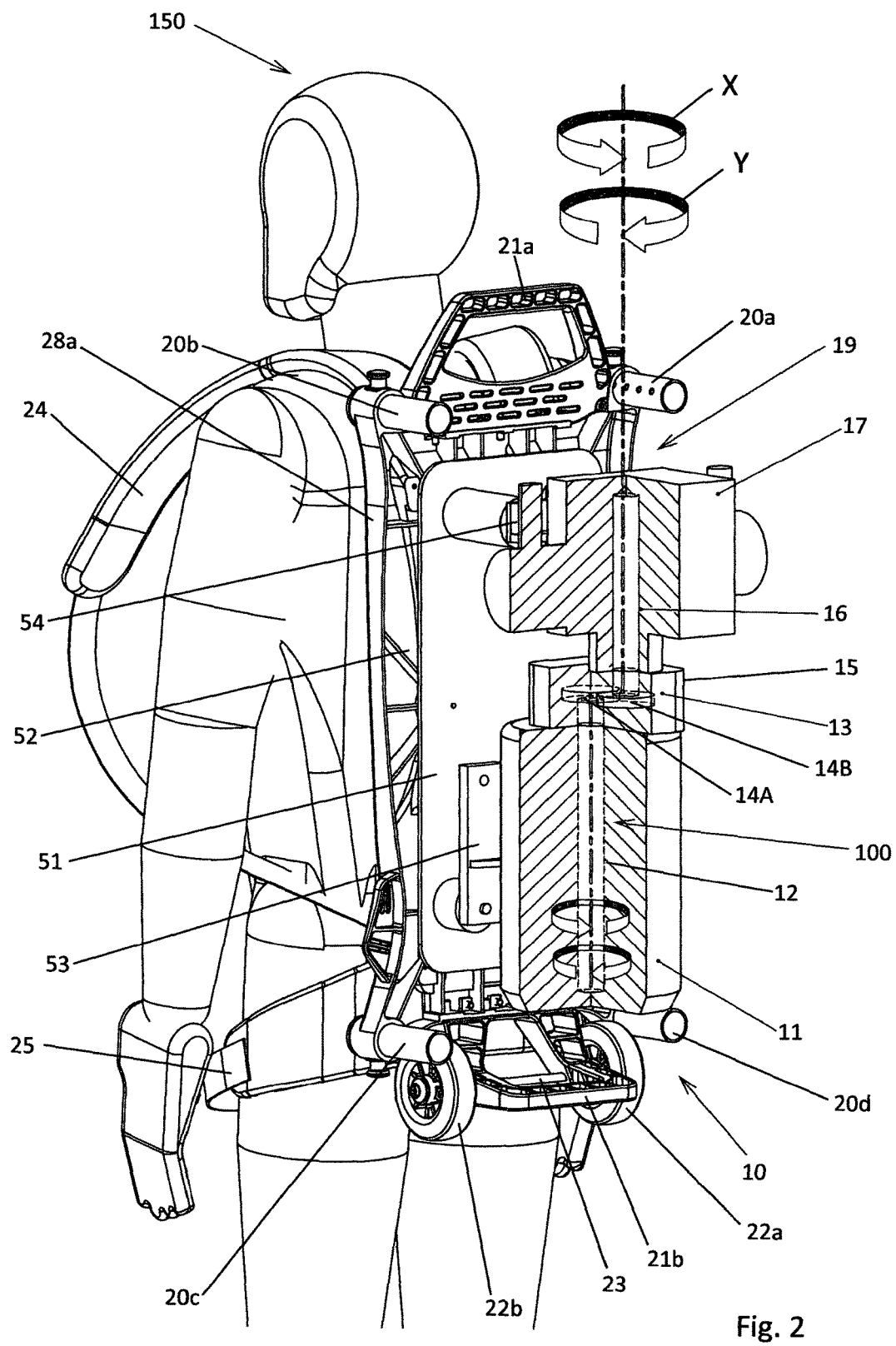
FIG. 2 is a partially cut away view of a second embodiment of the invention with said generator assembly having gears.
Figure 3:
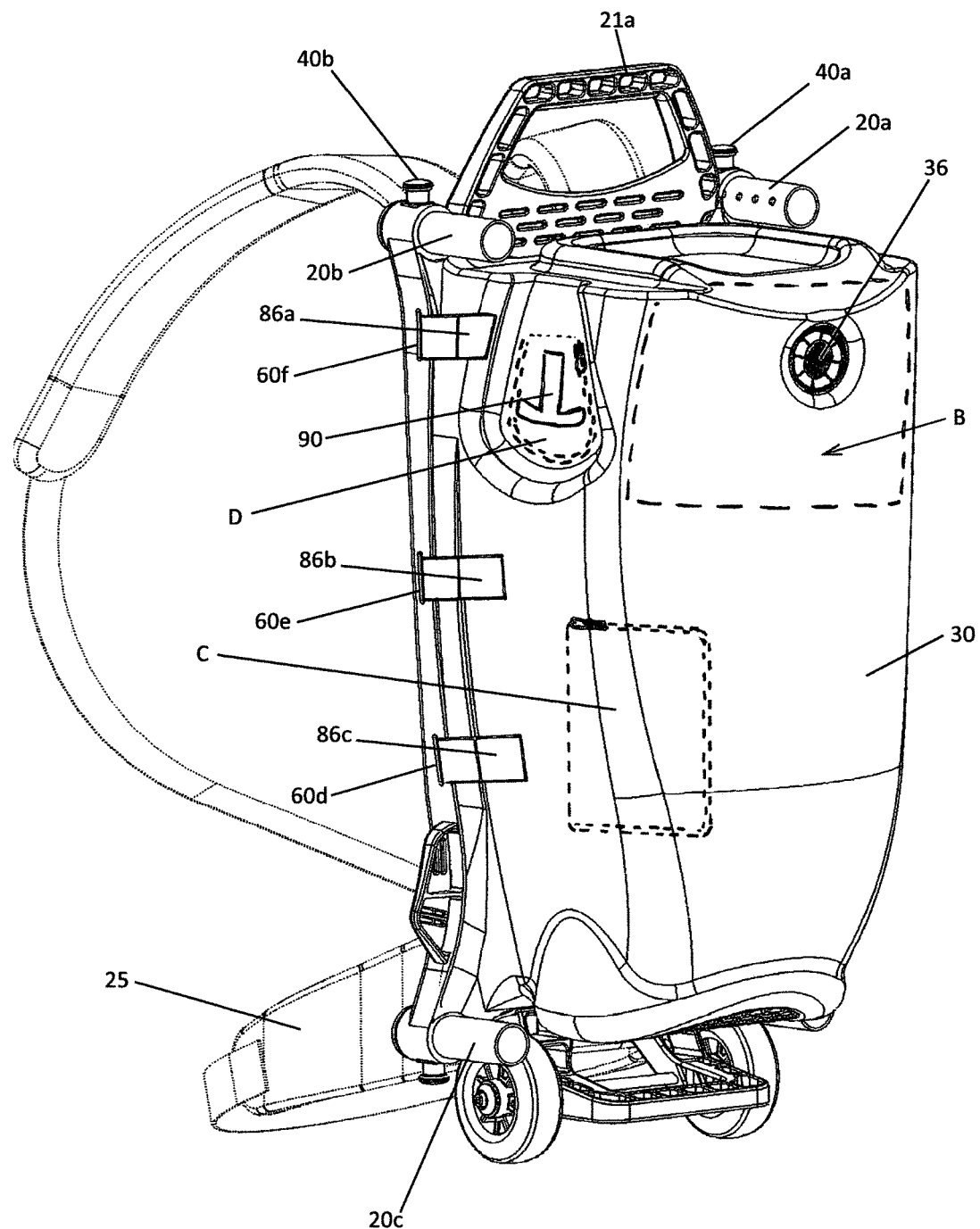
FIG. 3 is a perspective view of the generator assembly of the invention shown with its internal components housed within an outer cover.

The generator assembly 10 shown in FIGS. 1, 1A and 2 (engine etc. in FIGS. 1 and 2 shown in partially cut away view) has engine 17, alternator 11 and a shaft assembly 100 comprising engine shaft 16 and alternator shaft 12 with said engine shaft 16 coupled to said alternator shaft 12 so that said engine shaft 16 drives said alternator. Generator assembly 10 has frame 19 on which is mounted various components including said engine 17 and said alternator 12 and outer cover portion 30 for housing internal components of generator assembly 10 as shown in FIG. 3. Engine 17 and alternator 11 each have lower plate like portions 53 and 54 for mounting engine 17 and alternator 11 to frame 19 using mounting assembly 200 which will be described below with reference to FIGS. 4B-4D. Frame 19 has four corner portions each having a retractable leg 20a, 20b, 20c, 20d mounted thereon for supporting said generator assembly on the ground. A user (e.g. human being 150 shown in the drawings) can quickly unload said generator assembly from his back and deploy the legs so that the generator assembly can be stably supported on the ground in which position the generator assembly can be started up for generating power. FIG. 1A shows the generator assembly of FIG. 1 in perspective view without any engine/alternator portions shown cut away, dismounted from the back of a user. As can be seen from FIG. 1A alternator 11 has electric sockets 50a and 50b mounted on an upper portion thereof. These sockets are capable of being exposed to an exterior of the generator assembly by unzipping a flap of the cover (see FIG. 3) so that a user can power electrical equipment by plugging into electric sockets 50a and 50b.

Figure 4A:
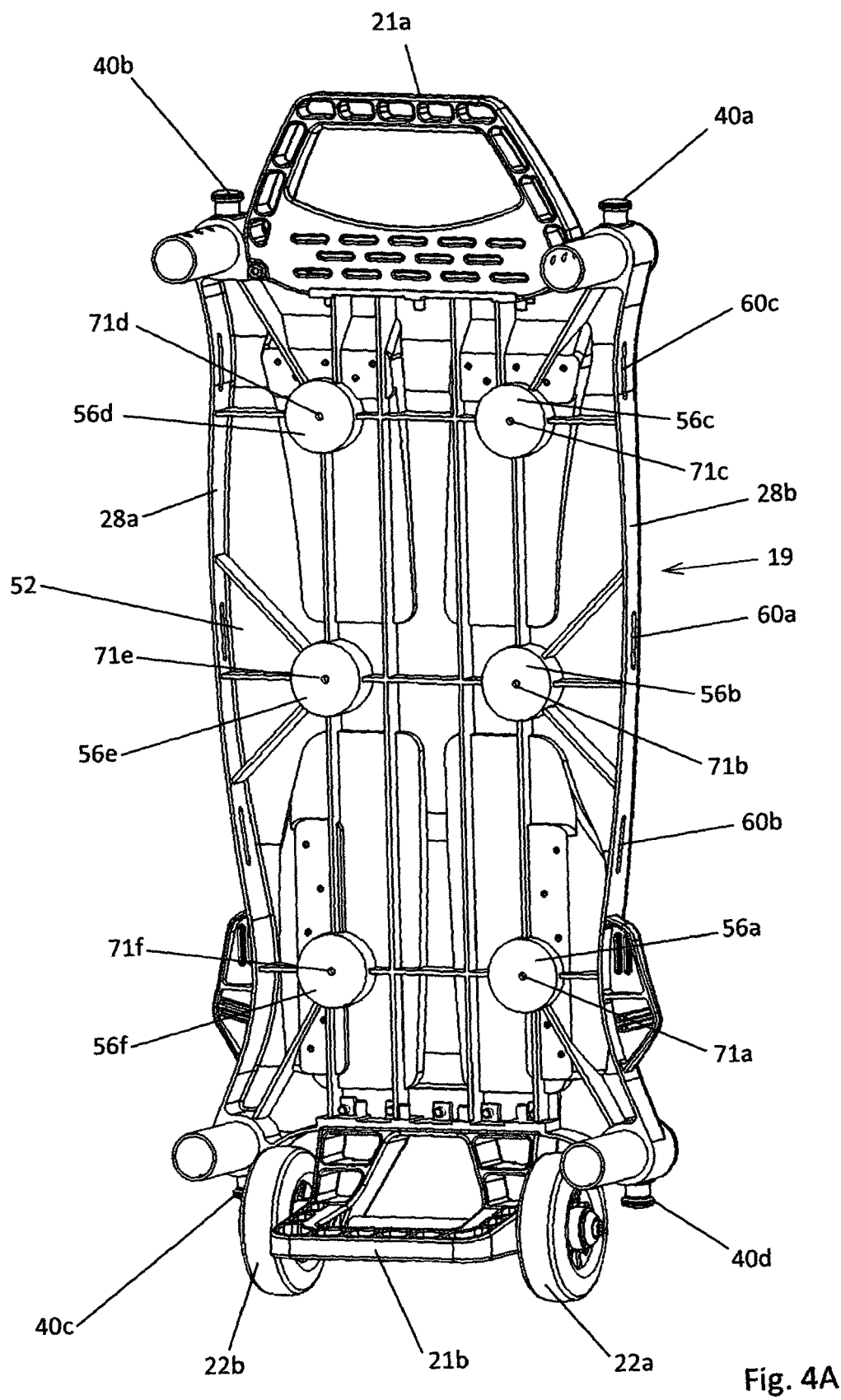
FIG. 4A is a perspective view of a frame portion of the generator assembly of the invention with the generator components of the generator assembly shown dismounted from the frame portion.
Figure 4B:
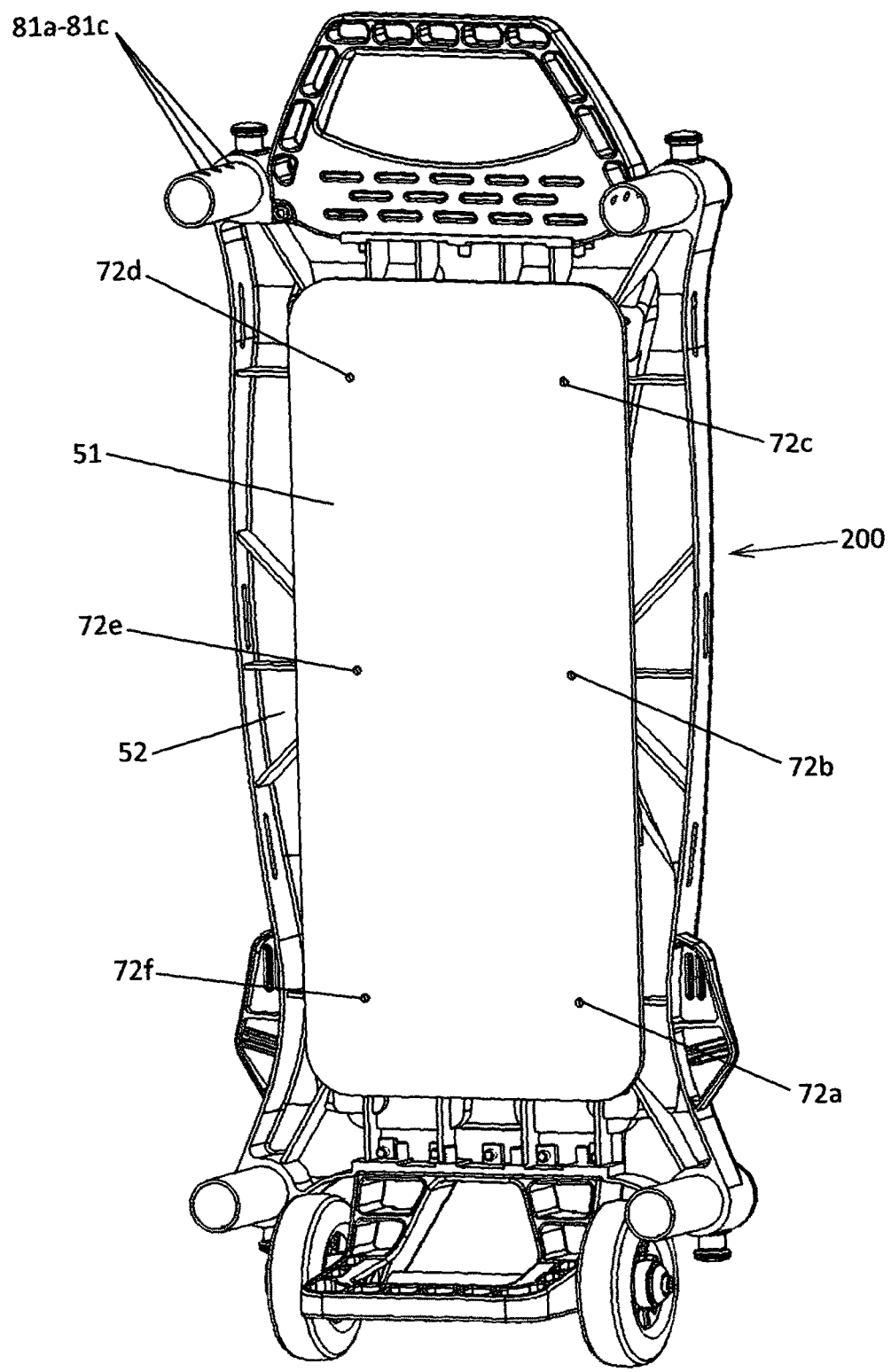
FIGS. 4B-4C show the frame portion of FIG. 4A further including portions of a mounting assembly for mounting the engine and alternator to the frame.
Figure 4C:
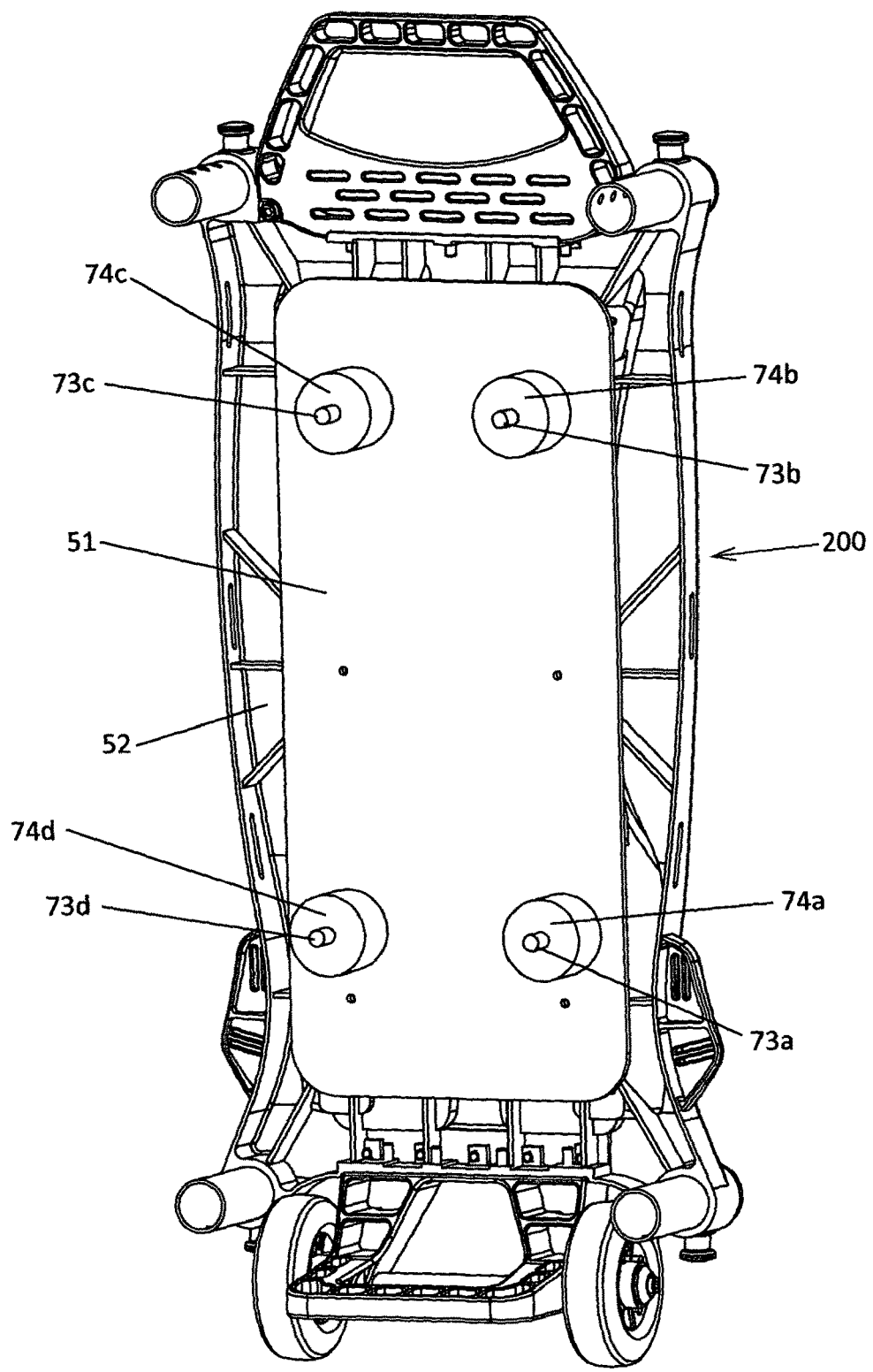
Figure 4D:
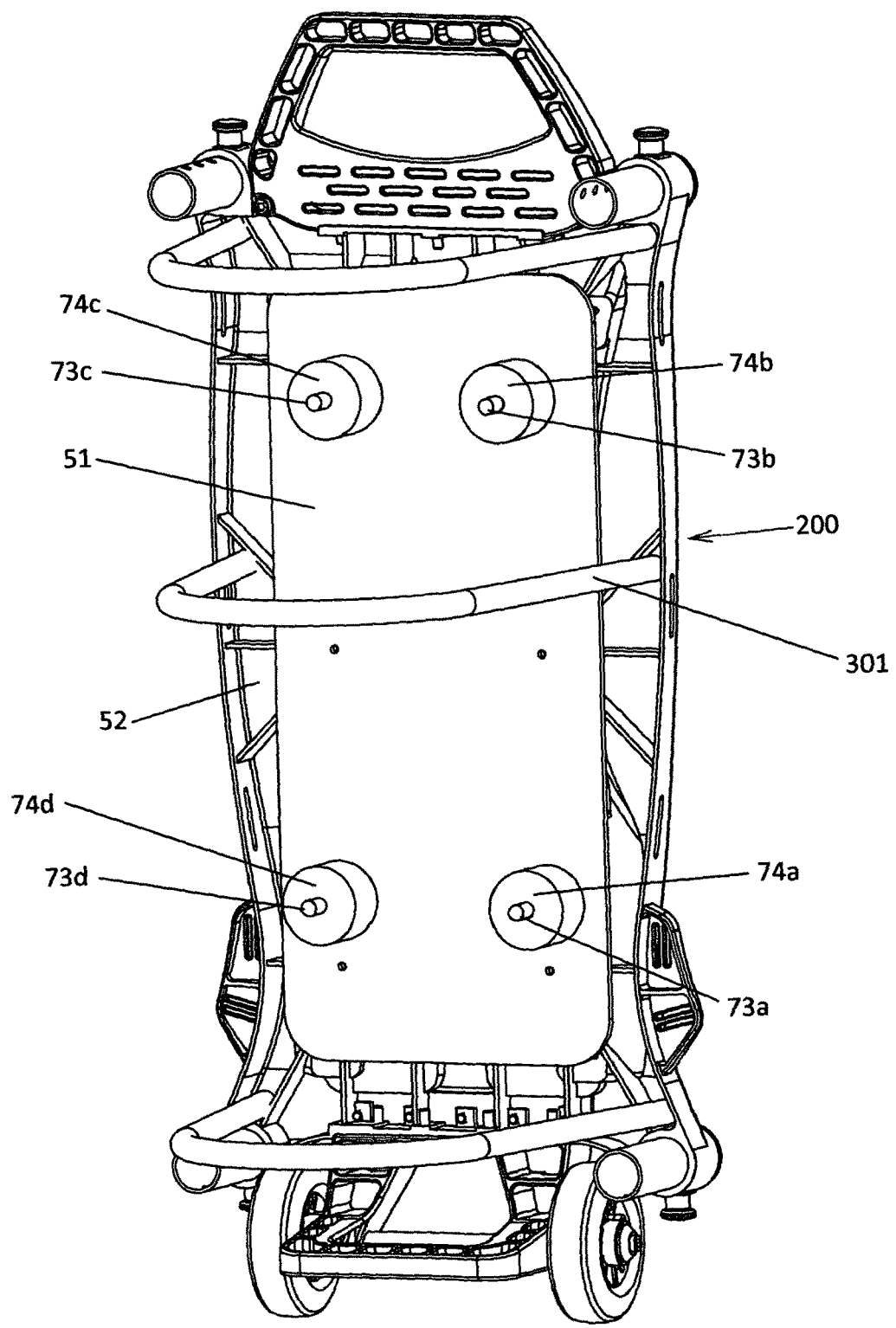
FIG. 4D is similar to FIG. 4C further showing a member for supporting a flexible outer cover of the generator assembly.

Frame 19 and mounting assembly 200 are best seen in FIG. 4B-4D (which shows the frame and mounting assembly with other components of the generator assembly dismounted therefrom). As shown in FIGS. 3 and 4A-4D for example frame 19 comprises a body portion 52 having side portions 28a and 28b on each side thereof. Side portions 28a and 28b have slots 60a-60f formed therein which cooperate with fasteners formed on exterior portions of cover portion 30 for fastening the cover portion 30 of the generator assembly 10 to the frame 19 as will be described in more detail by reference to FIG. 3 hereof. As can be seen in FIG. 4A frame 19 has an array of centrally disposed round protrusions 56a-56f, each round protrusion 56a-56f having a threaded hole 71a-71f at a centre thereof for receiving a screw therein so that mounting plate 51 (see e.g. FIGS. 1-2 and FIGS. 4B-4C) of mounting assembly 200 can be fastened to frame 19. Mounting plate 51 of mounting assembly 200 is shown in FIG. 4B attached to round protrusions 56a-56f of frame 19 with screws 72a-72f. As shown in FIGS. 1, 1A and 2 respective lower plate like portions 53 and 54 of alternator 11 and engine 17 are fastened to mounting plate 51 of mounting assembly 200. As shown in FIG. 4C mounting assembly 200 has upwardly cut off protruding portions 73a-73d which are cut off portions of bolts used for fastening respective alternator and engine parts of generator assembly 10 to mounting plate 51. In other embodiments (not shown) redundant portions of the mounting plate 51 are cut away to save weight. The cut off portions of the bolts 73a-73d as shown in FIG. 4C protrude through central portions of rubber dampers 74a-74d which function to dampen the vibrations of the engine and alternator when the generator assembly 10 is in use for generating electric power. In other embodiments (not shown) alternative means for dampening the vibrations of the engine and/or alternator can be used for example cable isolators (see www isolator-.Com/isolator series) either over plate 51 or underneath plate 51 or both and either combined with rubber dampeners or not and either under engine only or under both engine and alternator. Frame 19 is desirably formed from a lightweight material so that said generator assembly is sufficiently light that it can be carried relatively easy by a user. Frame 19 as shown in the Figures is formed from aluminium alloy and is machined out of a solid aluminium alloy block using computerised CNC milling methods well known to the skilled addressee. Alternatively frame 19 could be formed from magnesium alloy further to reduce weight. Subsequently ancillary parts of the frame e.g. handles 21a and 21b are fixed to frame 19. As can be seen in the Figures (for example FIG. 4A) each retractable leg 20a, 20b, 20c, 20d of frame 19 has an locking pull pin 40a-40d for locking the leg either in a fully retracted position or in a chosen deployment position. Locking pull pin 40a-40d engages with holes 81a-81c (see FIG. 4A) formed in a circumferential portion of each of retractable legs 20a, 20b, 20c, 20d for locking each leg in a chosen position and each locking pull pin has resilient means for biasing said pin towards a locked position of said pin. The figures each show retractable legs 20a, 20b, 20c, 20d in fully retracted position whereby generator assembly 10 is configured for being carried on the back of a user. Retractable legs 20a, 20b, 20c, 20d can be deployed into a deployed position suitable for supporting generator assembly 10 stably on the ground. The frame has shoulder straps 24 and belt 25 so that the generator assembly 10 can be comfortably carried by a user. Desirably said shoulder strap and said belt are padded for additional comfort. The frame 19 has a wheel assembly comprising wheels 22a and 22b mounted for rotation on axle 23. Axle 23 is mounted on a bottom end portion of the frame and the wheel assembly further comprises handle 21b mounted between the wheels 22a and 22b. A further handle 21a is mounted on a top end portion of the frame so that the generator assembly can be conveniently wheeled about on the ground by a user pulling the generator assembly along by its handle 21a. Alternatively the generator assembly can be carried from place to place using handles 21a and 21b.

Engine 17 has been developed in accordance with the inventor's specifications in collaboration with Ricardo Plc which is a multinational company operating in various countries including the UK. Ricardo Plc can be contacted through its affiliate Ricardo UK, Shoreham Technical Centre, Shoreham-by-Sea, West Sussex BN43 5FG. Engine 17 is a modified version of Ricardo's 3 hp UAV engine, specifications of which were published in Ricardo's IRAD update in 2010.

Engine 17 puts out 6 HP and is a multi fuel spark ignited twin piston "boxer" type engine, utilising a mechanically compressed direct injection (MCDi) system which combine fuel and air using a compressor. The fuel and air mixture is injected into the combustion chamber of each cylinder through a delivery timed valve in an atomised/molecularized state, allowing even heavy fuels to ignite at lower temperatures. This atomisation/molecularization technology can operate on a variety of fuels for example diesel, bio diesel, Ethanol, Kerosene, JP5, JP8, Jet A and gasoline.

Engine 17 drives engine shaft 16 which in turn drives alternator shaft 12 of alternator 11. Engine shaft 16 is coupled to alternator shaft 12 by a coupling means as discussed in more detail below. Alternator 12 is an asynchronous alternator which is commercially available from Metallwarenfabrik Gemmingen Gmbh, of Postfach 9-75046 Gemmingen TEL: +49(0)7267 8060 FAX: +49(0)7267 806 100. See also www.metalwarenfabrik.com. Alternator 12 is a Metallwarenfabrik Gemmingen Gmbh type identified as '2801 GEKO/EISEMANN Modell 2008'. In other embodiments other asynchronous generators can be used. In alternative embodiments synchronous alternators can be used. In other embodiments of the generator assembly 10 different engines can be used, provided they have sufficient power output to drive a chosen alternator.

As shown in FIG. 1 engine shaft 16 is coupled to alternator shaft 12 by a coupling means which does not include gears. Engine shaft 16 and alternator shaft 12 are each disposed along a common axis 18 as shown.

In the embodiment of the inventive generator assembly as shown in FIG. 2 engine shaft 16 and alternator shaft 12 are coupled by a coupling means which includes gear box 15. Gear box 15 has gear wheels 14A and 14B which are capable of being placed in gear with each other or out of gear with each other by means well known to the skilled addressee. In the embodiment shown in FIG. 2 engine shaft 16 and alternator shaft 12 are each disposed along separate axes, said separate axes being substantially parallel with each other. Each of the engine shaft 16 and the alternator shaft 12 can rotate either in a clockwise direction or an anticlockwise direction as shown respectively by arrows "X" and "Y" in FIGS. 1 and 2. A shaft assembly 100 comprising respective shafts 16 and 12 is substantially parallel to a longitudinal axis of the human being 150 carrying the alternator assembly of the subject invention as shown in the drawings. As a result of the shaft assembly 100 being disposed in this way when the generator assembly is being carried on the back of the human 150 said generator assembly is positioned substantially within a periphery of the body of the human so that the human can carry the generator assembly without banging the generator assembly on external structures for example a door frame. The generator assembly 10 as shown is capable of providing over 2,000 watts of electrical power preferably 2,000 to 2,500 watts of electrical power. The generator assembly 10 can be used to drive power tools up to the rated output, putting out for example either on 230V and 50 Hz frequency or on 120V and 60 hz frequency. Additionally it has a DC outlet for either 12V or 24V.

FIG. 3 shows the generator assembly of the subject invention with its inner components which are shown and described herein housed within outer cover portion 30. Cover portion 30 is preferably formed from layers of textile stitched together to form a flexible cover which is stretched over support members 301 (see FIG. 4D) of frame 19 and then fastened to said generator assembly thereby covering the internal (e.g. engine) components of the generator assembly as can be seen in FIGS. 3 and 4D. Cover portion 30 has fasteners 86a-86c affixed thereto for releasably fastening the cover portion 30 of the generator assembly to frame 19. Each fastener 86a-86c has an upper portion securely fixed (e.g. sowed) to cover portion 30 and a lower portion which engages with each corresponding slots 60a-60f formed in side portions 28a and 28b of frame 19 for releasably fastening the cover portion 30 of the generator assembly to frame 19. Cover portion 30 can easily be removed from generator assembly 10 by releasing fasteners fasteners 86a-86c from corresponding slots 60a-60f of frame 19 for example for servicing engine 17 or alternator 11. Cover portion 30 preferably is a composite cover portion comprising a lower fabric layer positioned closest to the said internal components which is porous to sound waves coming from the engine etc, a middle sound absorbing layer, and an outer fabric layer which is weather resistant preferably waterproof and relatively not porous to sound. Sound waves coming from the engine etc are then preferably absorbed as follows. The sound passing through the said lower fabric layer positioned closest to the said internal components are partially absorbed by the middle sound absorbing layer and then bounce off the said outer layer (relatively not porous to sound) back into the middle layer where more sound absorbing occurs. The said lower fabric layer positioned closest to the said internal components is for example formed from a Cordura and Fibreglass fabric (also having fire resistant properties). Cordura is an Invista brand of Dupont. The said middle sound absorbing layer is for example formed from Basotect or Glasswool. Basotect is a brand name of a family of products for sound insulation made from foamed melamine resin. The said outer fabric layer which is preferably waterproof and relatively not porous to sound is for example a Cordura and silicon coated fibreglass fabric or nylon. In alternative embodiments (not shown) the outer cover portion is a rigid composite material formed of two or more layers, for example the outer layer being a rigid carbon fibre/composite cover and the inner layer being an insulation material e.g. Basotect or fibreglass wool. Optionally an additional ballistic resistant fabric inner layer could be added to form a ballistic resistant cover portion 30. Cover portion 30 has openings for components such as fuel tank lid 36 engine start handle 90 and electric sockets 50a and 50b (see for example FIGS. 1A and 3) and optionally for other sockets and/or control panels of the engine/generator (not shown) which are preferably exposed to the exterior either for manipulation or viewing by a user of the generator assembly 10. As can be seen from FIG. 3 generator assembly 10 has engine start handle 90 exposed to the outside through opening 'D' which opening can be opened/closed by unzipping/zipping up the zipper shown by dotted lines. Generator assembly 10 also has electric sockets and optionally a control panel which are shown in FIG. 3 covered by zipped up opening C of cover portion 30 and which can be exposed to the exterior by unzipping the zip shown by dotted lines surrounding area C. Area B shown surrounded by dotted lines in FIG. 3 shows the position of a fuel tank for engine 17. Other materials can be used to make cover portion 30 as would be well known to the skilled addressee. The fuel tank can be made from conventional rigid materials for making fuel tanks for example metals as is well known to the skilled addressee. Alternatively the fuel tank is made from a flexible bladder like material for example a triple layer polyethylene film. Optionally such a bladder type fuel tank can comprise a one way breather valve in addition to the usual fuel outlet assembly which avoids the formation of a vacuum in the bladder and in addition enabling the operator to inflate portions of the interior of the bladder that are empty of fuel with air to give the bladder shape and slight pressure to push the remaining fuel to an outlet valve of the fuel outlet assembly. An advantage of having a bladder type fuel tank arises when the generator assembly is being used by a group of emergency personnel for example during a rescue mission. Spare fuel bladders (e.g. 3 liter bladders) filled with extra fuel for powering the generator assembly can then conveniently be carried by several members of the group of emergency personnel thereby providing extended operational time for the generator. Roughly speaking 3 liters of fuel will give up to 3 hours of engine time. Alternatively the flexibility of a bladder type fuel container enables the attachment of the bladder to a portion of the cover portion 30 of the generator assembly or the insertion of the bladder into a portion of the cover portion 30 of the generator assembly. The generator assembly described herein is suitable for emergency use and can be carried by for example search/recovery/police personnel during rescue missions who might wish to power emergency equipment, lighting equipment, night sight equipment or other electrical equipment from it. The generator assembly described herein is also suitable for other civilian or military use.

Figure 5:
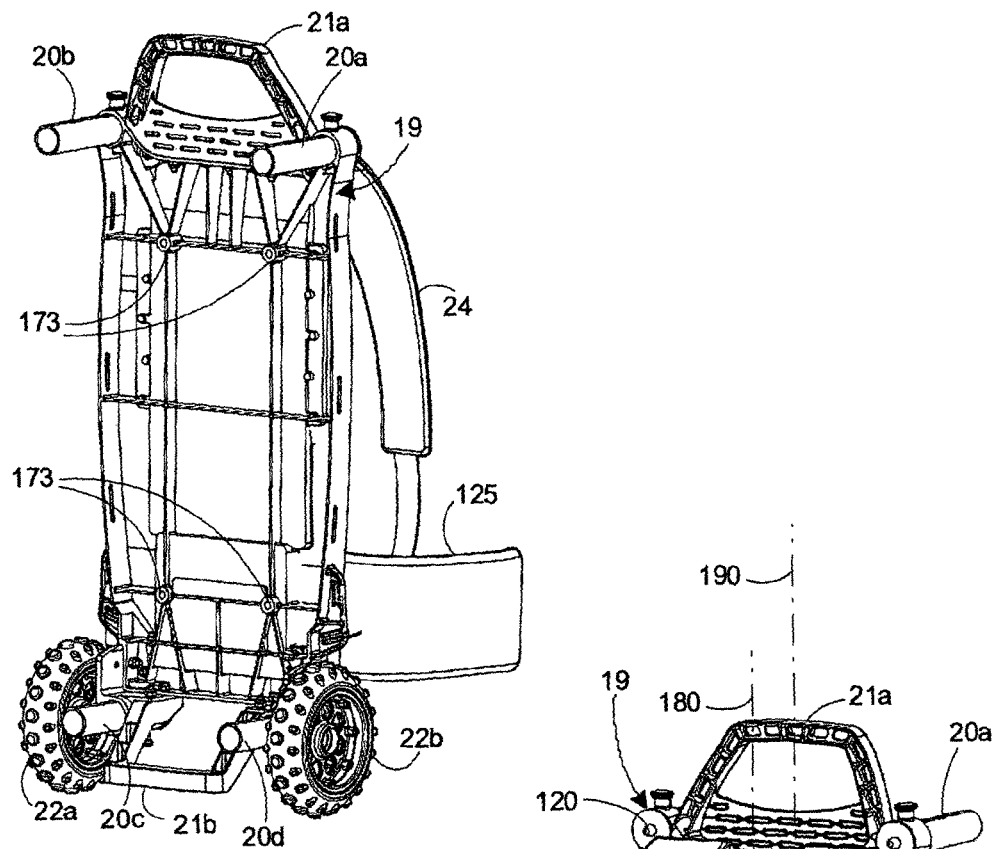
FIG. 5 is a front perspective view of a frame assembly of another embodiment.
Figure 6:
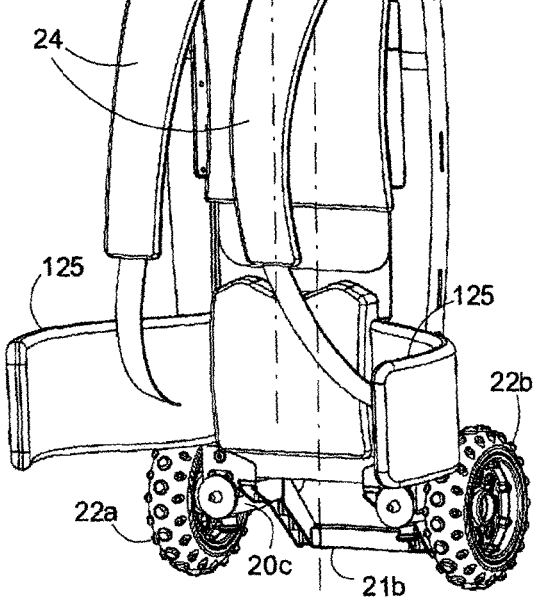
FIG. 6 is a rear perspective view of the frame assembly of FIG. 5.

FIGS. 5 and 6 show a frame assembly somewhat similar to that of FIGS. 4A to 4D. However, in accordance with a preferred feature of the invention, attachment points, in the form of threaded bosses 173 (FIG. 5) are provided at two longitudinal positions near the top end and bottom end of the frame 19. Bosses 173 are disposed in an elongate rectangular array which is aligned with the longitudinal axis 190 of the frame 19 and the longitudinal axis 180 defined by the mid-plane of shoulder straps 24 (see FIG. 6).

As best seen in FIG. 6, the frame assembly is also provided with rigid forwardly extending stabiliser arms 125 on either side of its lower end. These fit round the waist of the user and stabilise the load. The lower ends of shoulder straps 24 can either be secured (by means not shown) to the stabiliser arms 125 or can pass through slots (not shown) in these stabiliser arms to attachment points on the lower end of the frame 19.

Figure 7:
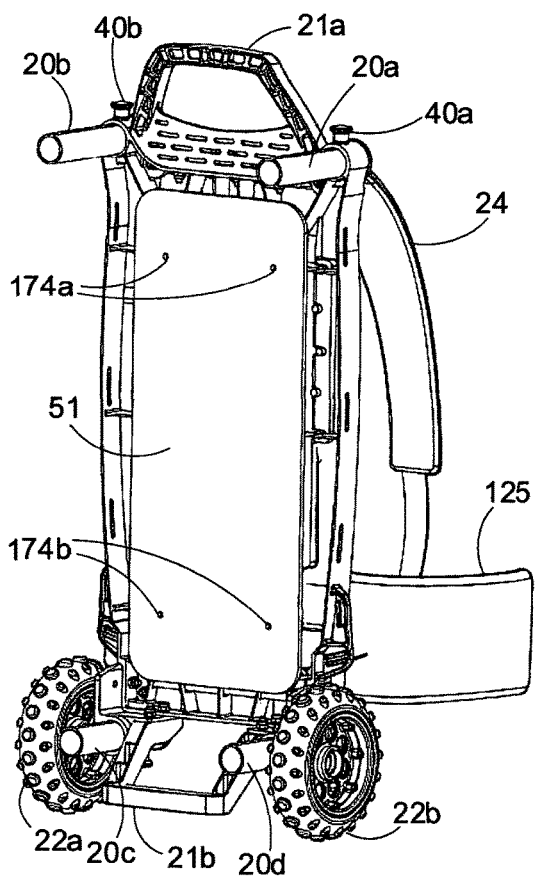
FIG. 7 is a front perspective view of the frame assembly of FIGS. 5 and 6, showing a mounting plate attached to the front of the frame.

FIG. 7 shows a mounting plate 51 aligned with the frame assembly of FIGS. 5 and 6. Mounting plate 51 is provided with an elongate rectangular array of holes 174a, 174b which register with threaded bosses 173.

Figure 8:
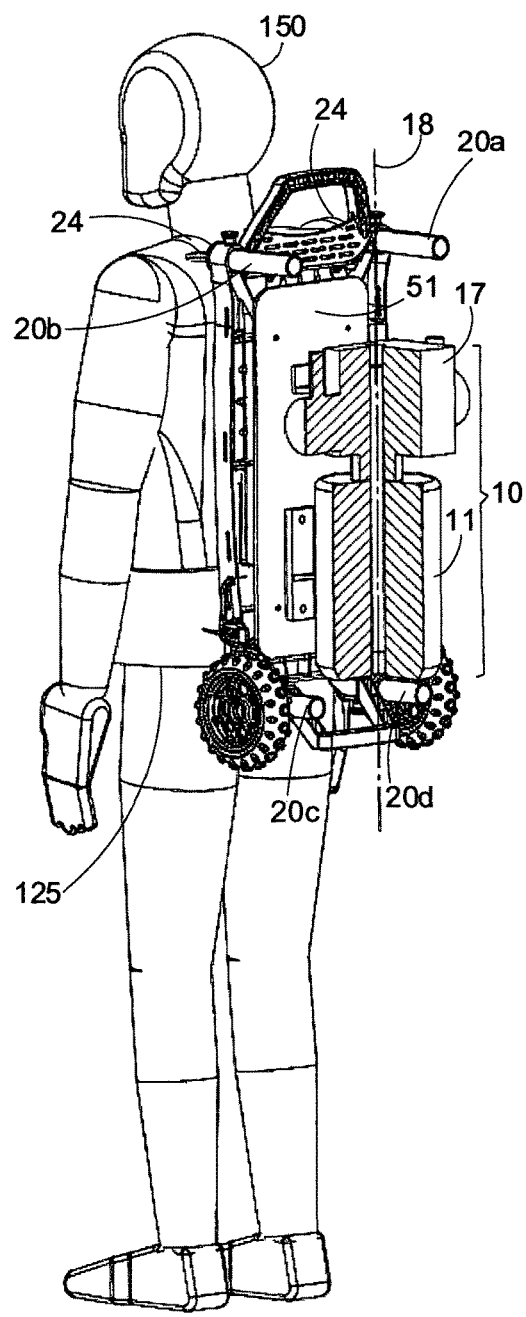
FIG. 8 is rear perspective view of the embodiment of FIGS. 5 to 7, showing the generator assembly, shown partially cut away, carried by a user.

As shown schematically in FIG. 8, a generator set 10, similar to that of FIGS. 1 and 1A and employing a Ricardo multi-fuel engine 17, is mounted on mounting plate 51, by means of bolts (not shown) through holes in mounting portions (not shown) of the generator set. These bolts pass through holes 174a, 174b and are screwed into threaded bosses 173.

Figure 9:
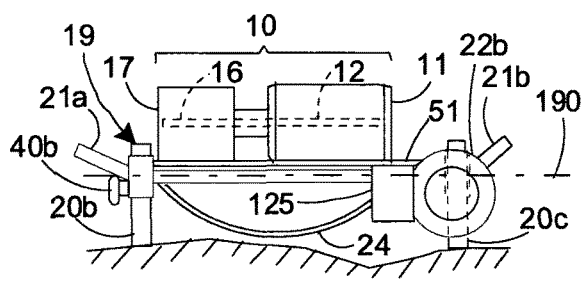
FIG. 9 is a side elevation of the generator assembly of FIG. 8, shown supported on a ground surface with the legs in the deployed configuration.

FIG. 9 shows the generator assembly of FIG. 8 dismounted from the user 150 and supported horizontally on a ground surface. To this end, cylindrical legs 20a-20d are deployed by withdrawing their associated locking pins 40a-40d, sliding them through their mounting apertures so that they project forwardly (ie downwardly in FIG. 9) through frame 19, and then securing them in this configuration by re-inserting the locking pins. It will be seen that the longitudinal frame axis 190 is roughly horizontal and is parallel to the common shaft assembly 16, 12 of the engine 17 and alternator 11.

The legs 20a-20d can be retracted to allow the left hand end of generator assembly to be lifted at handle 21a and moved on its wheels 22b to another location if required. Alternatively, minor adjustments to the position of the generator assembly can be made by lifting it at or dragging it using handle 21b and/or handle 21a.

Figure 10A:
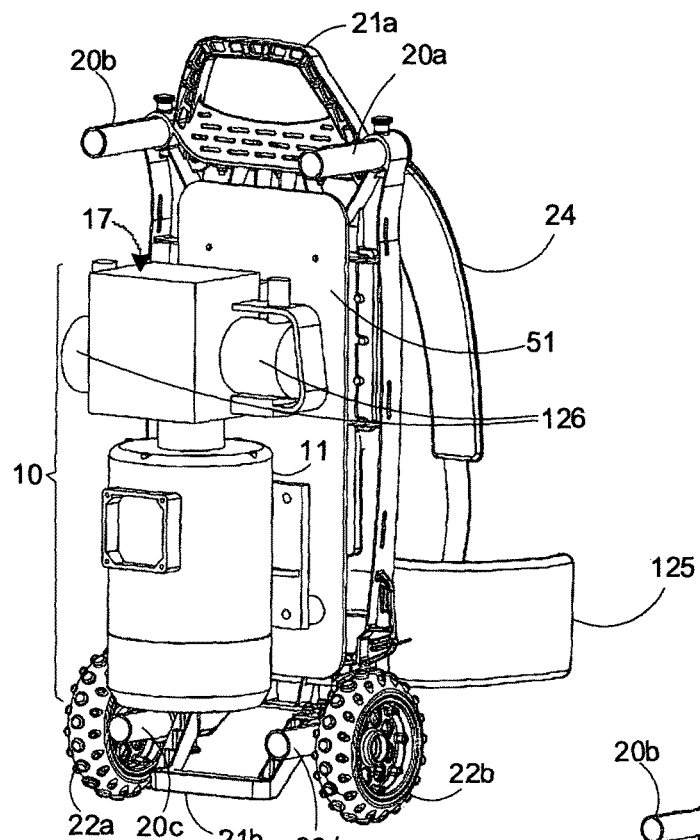
FIG. 10A is a perspective view of the generator assembly of FIG. 8, as part of a modular power supply system.

FIG. 10A shows the generator assembly of FIG. 8 used as part of a modular power supply system using different generator sets and also a battery pack as described below. FIG. 10A also shows the compressor and atomiser assembly 126 of multi-fuel engine 17.

Figure 10B:
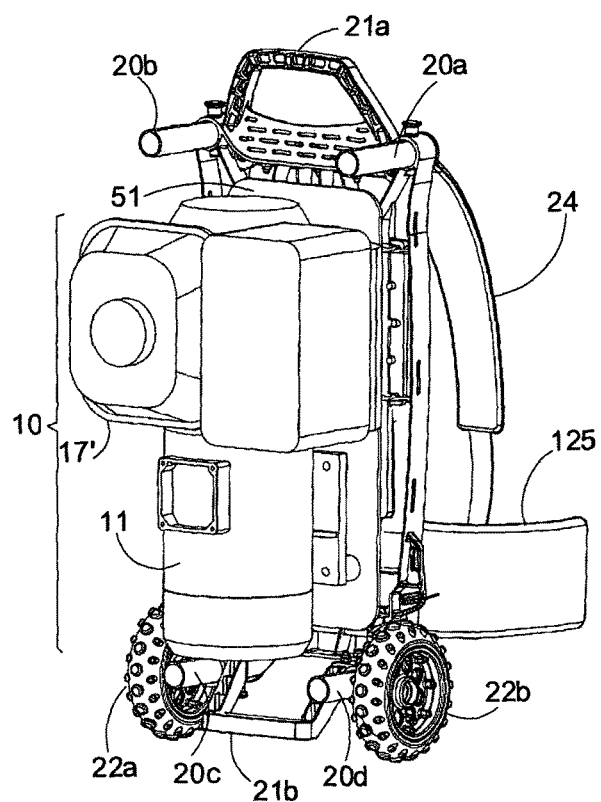
FIG. 10B is a perspective view of a similar generator assembly with a different engine, forming part of the modular power supply system.

FIG. 10B shows a further generator assembly using a different generator set 10. This uses the same alternator as that of FIG. 10A but engine 17' is a commercially available Honda GX-160 petrol engine.

Figure 10C:
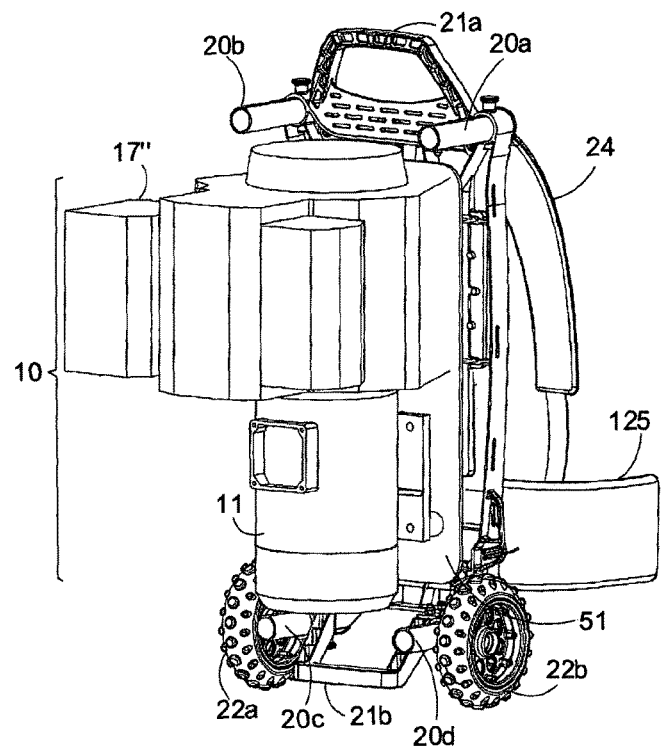
FIG. 10C is a perspective view of a similar generator assembly with another engine, forming part of the modular power supply system.

FIG. 10C shows a further generator assembly using a different generator set 10. This uses the same alternator as that of FIG. 10A but engine 17" is a commercially available Yanmar L series (eg a Yanmar L48) diesel engine.

Figure 10D:
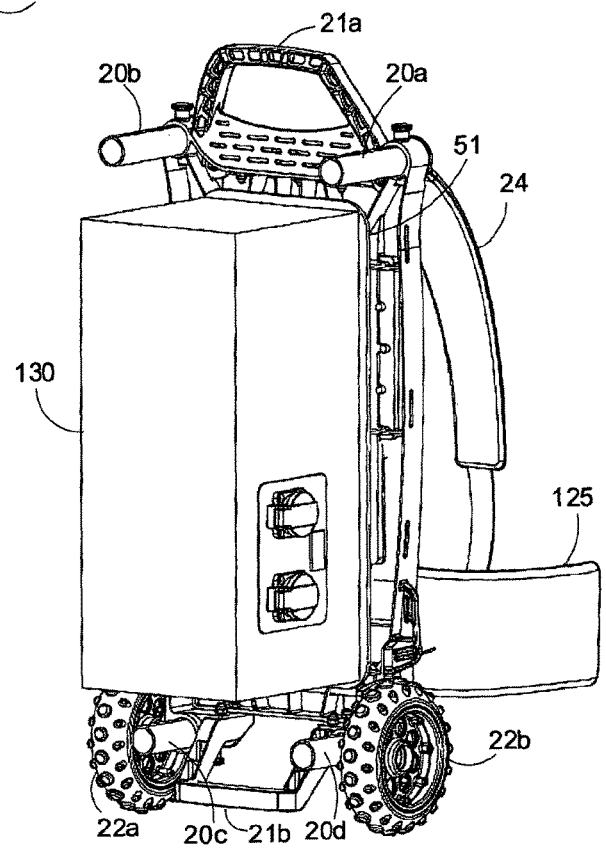
FIG. 10D is a perspective view of a battery pack, forming part of the modular power supply system.

FIG. 10D shows a lithium ion rechargeable battery pack 130 mounted on a mounting plate 51 of a frame 19 instead of a generator set. It is envisaged that the resulting power supply module could be used with one or more of the modules of FIGS. 10A to 10C as a temporary power source eg at the site of a natural disaster or in other emergency situations, providing both AC and DC power supply.

Figure 10E:
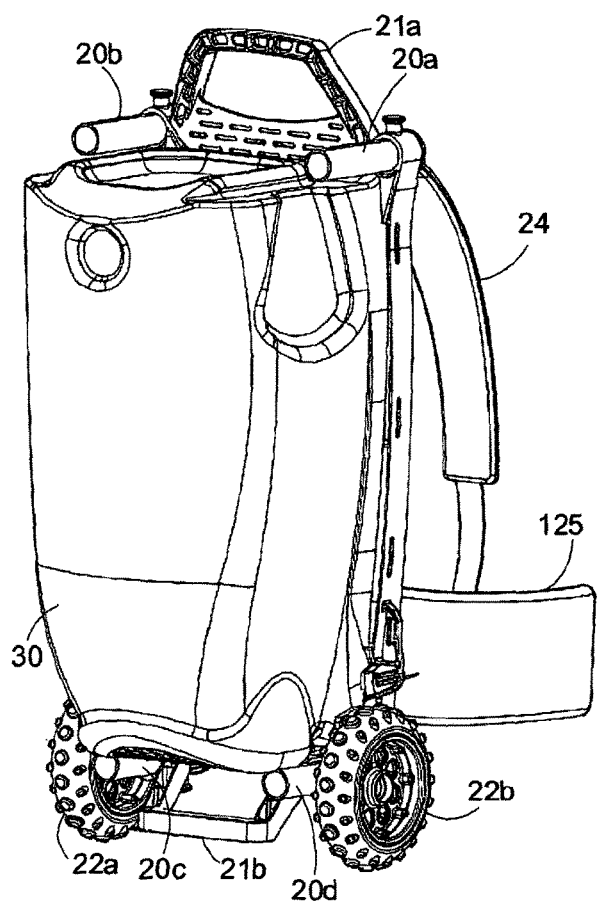
FIG. 10E shows a generator assembly of the FIG. 5 embodiment with a cover.

FIG. 10E shows the provision of a protective cover 30 over one of the above-described power supply modules. This may have eg properties of sound absorbance for silencing said internal components of a generator assembly and/or ballistic resistant properties and/or waterproofing properties and/or fire proofing properties.

Figure 11:
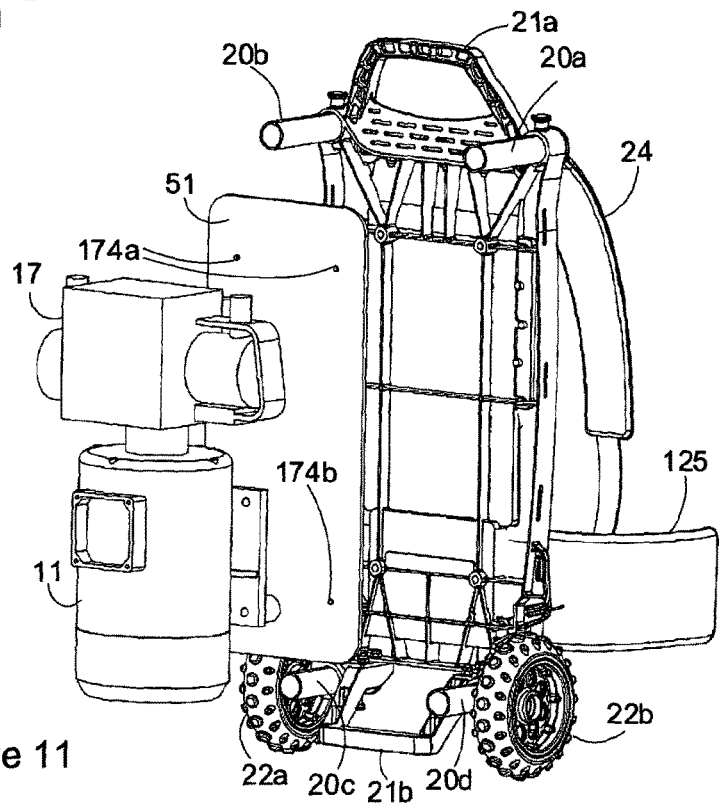
FIG. 11 is an exploded perspective view showing the assembly/disassembly of the generator assembly of FIGS. 8 and 10A.

FIG. 11 shows the disassembly or assembly of the power supply module of FIG. 10A. This involves the unscrewing or screwing of only four bolts through holes 174a in mounting plate 51. Thus the power supply modules, using a common frame 19 and mounting plate 51, can easily be modified, serviced and re-assembled.

Modifications may be made to all the described embodiments. For example the harness may be modified in accordance with US 2012/0043361A which discloses a sliding plate at the top of the frame and an unfolding hinge assembly at the bottom of the frame. These allow a load to be moved forward towards a user's shoulders when the user is crawling or lying down, which improves ergonomics in some circumstances and enables a heavier load to be carried.

Furthermore a dynamo (generating DC) could be utilised instead of an alternator as in the described embodiments. In general any suitable generator (ie DC or AC) may be used.

Typically, generator assemblies in accordance with the invention are capable of providing at least 2000 watts of electrical power and have a weight of less than 40 kilograms.

In the described embodiments the frame 51 is a plate like frame substantially rectangular in shape and having a front for being placed adjacent the back of the user 150 and a back having mounted thereon the engine 17, the alternator 11 and the shaft assembly 16, 12. However non-rectangular frames may be used in other embodiments.

In the described embodiments each of the longer sides of frame 51 has an array of slots formed therein for engaging with corresponding fasteners affixed to an outside of outer cover portion 30 for removably fixing the outer cover portion to the frame 19. However the outer cover portion may be fixed to the frame 19 in other ways.

The invention claimed is:

1. A back-pack generator assembly suitable for being carried on the back of a human, the generator assembly comprising
a) a generator set (10) supported by a pair of laterally spaced apart shoulder straps (24), the shoulder straps having a longitudinal axis (180), the generator set comprising an engine (17), an alternator or dynamo (11) longitudinally spaced apart from the engine and a shaft assembly for driving said alternator or dynamo, wherein one or more shafts (16, 12) of said shaft assembly are substantially parallel to said longitudinal axis and
b) an elongate frame (19) configured for being strapped to the back of said human with said straps, said frame having a longitudinal axis wherein one or more of the shafts of said shaft assembly are substantially parallel to said longitudinal axis of said frame
wherein said generator set is a module removably attached to said frame at only two longitudinally spaced apart positions (174a, 174b) said shaft assembly comprising a common shaft (16, 12) coupling said engine and alternator or dynamo at an intermediate longitudinal position.

2. A back-pack generator assembly according to claim 1, wherein said generator set (10) is secured to said frame (19) by a rectangular array of four screwed fasteners (174a, 174b), two at each of said longitudinally spaced-apart positions (174a, 174b).

3. A back-pack generator assembly according to claim 2, wherein said module comprises a mounting plate (51) which carries said generator set (10) and is removably attached to said frame (19) at said two longitudinally spaced-apart positions.

4. A back-pack generator assembly according to claim 2 wherein said common shaft (16, 12) couples said engine (17) to said alternator (11) directly without a gearbox.

5. A back-pack generator assembly according to claim 1, wherein said frame (19) has an array of deployable legs (20a to 20d) mounted thereon for supporting said generator set (10) on the ground.

6. A back-pack generator assembly according to claim 5, wherein said deployable legs (20a to 20d) are mounted at corner portions of said frame (19), are substantially orthogonal to a common plane of said corner portions and are slidable from a retracted configuration in which the array of legs surrounds said generator set (10) and projects away from a rear side of the frame on which said generator set (10) is mounted to a deployed configuration in which the array of legs projects towards the ground from a front side of the frame.

7. A back-pack generator assembly according to claim 1, wherein said elongate frame (19) has one or more wheels (22a, 22b) at one end thereof and a handle (21a) at another end thereof to enable the generator assembly to be pulled along the ground on said one or more wheels.

8. A back-pack generator assembly as claimed in claim 1, said generator assembly further comprising an outer cover portion (30) for housing internal components of said generator assembly.

9. A back-pack generator assembly as claimed in claim 8, wherein said frame (19) has a peripheral array of slots (60a-60f) formed therein for engaging with corresponding fasteners (86a-86c) affixed to an outside of said outer cover portion (30) for removably fixing said outer cover portion to said frame.

10. A back-pack generator assembly as claimed in claim 8 wherein said outer cover portion (30) has properties of sound absorbance for silencing said internal components of said generator assembly and/or ballistic resistant properties and/or waterproofing properties and/or fire proofing properties.

11. A back-pack generator assembly as claimed in claim 8, said outer cover portion (30) being a rigid or flexible composite material formed of two or more layers.

12. A back-pack generator assembly as claimed in claim 1, wherein said engine (17) is suitable for being fuelled by middle distillate fuel, said engine further comprising an atomizing assembly (126) for atomizing said middle distillate fuel such that said middle distillate fuel can be ignited by a spark.

13. A back-pack generator assembly as claimed in claim 12, wherein said engine (17) further comprises a compressor (126) for feeding said middle distillate fuel through said atomizing assembly under pressure.

14. A back-pack generator assembly as claimed in claim 1, wherein said engine (17) is a boxer type engine.

15. A back-pack generator assembly as claimed in claim 1, wherein said alternator (11) is an asynchronous alternator.

16. A modular back-pack power supply system comprising an elongate frame (19) having a longitudinal axis, a pair of laterally spaced apart shoulder straps (24), the shoulder straps having a longitudinal axis (180) which is substantially parallel with the longitudinal axis of the elongate frame, and an elongate generator set module (10) comprising an engine (17), an alternator or dynamo (11) longitudinally spaced apart from the engine and a shaft assembly for driving said alternator or dynamo, wherein said elongate generator set module is mountable on said frame with one or more shafts (16, 12) of said shaft assembly substantially parallel to said longitudinal axes to form a back-pack generator assembly suitable for being carried on the back of a human;
wherein said generator module is removably attachable to said frame at only two longitudinally spaced-apart positions (174a, 174b) said shaft assembly comprising a common shaft (16, 12) coupling said engine and alternator at an intermediate longitudinal position.

17. A modular back-pack power supply system according to claim 16, wherein said generator set module (10) is removably attachable to said frame (19) at only two longitudinally spaced-apart positions (174a, 174b), said shaft assembly comprising a common shaft (16, 12) coupling said engine (17) and alternator (11) at an intermediate longitudinal position.

18. A modular back-pack power supply system according to claim 17, wherein said generator set module (10) can be bolted to said frame (19) by a rectangular array of four screwed fasteners (174a, 174b), two at each of said longitudinally spaced-apart positions (174a, 174b).

19. A modular back-pack power supply system according to claim 16, further comprising a battery module (130) which is removably attachable to said frame (19) in place of said generator set module (10) at mounting positions (174a, 174b) which correspond to mounting positions (174a, 174b) used for the generator set module.

20. A modular back-pack power supply system according to claim 16, further comprising one or more further generator set modules (10) having different engines (17).

21. A modular back-pack power supply system according to claim 16 wherein said generator set module comprises a mounting plate (51) which carries said generator set (10) and is removably attachable to said frame (19).

22. A modular back-pack power supply system according to claim 16, wherein said generator set module comprises a generator set (10) wherein said shaft assembly comprise a common shaft which couples said engine to said alternator directly without a gearbox.

23. A modular back-pack power supply system according to claim 16, wherein said alternator is an asynchronous alternator.

24. A modular back-pack power supply system according to claim 16, wherein said generator set module comprises a frame (19) having an array of deployable legs (20a to 20d) mounted thereon for supporting said generator set (10) on the ground.

25. A modular back-pack power supply system according to claim 16, wherein said elongate frame (19) for being strapped to the back of said human with said straps (24) wherein said elongate frame (19) has one or more wheels (22a, 22b) at one end thereof and a handle (21a) at another end thereof to enable the generator assembly to be pulled along the ground on said one or more wheels.

* * * * *